Figures 1, 2:
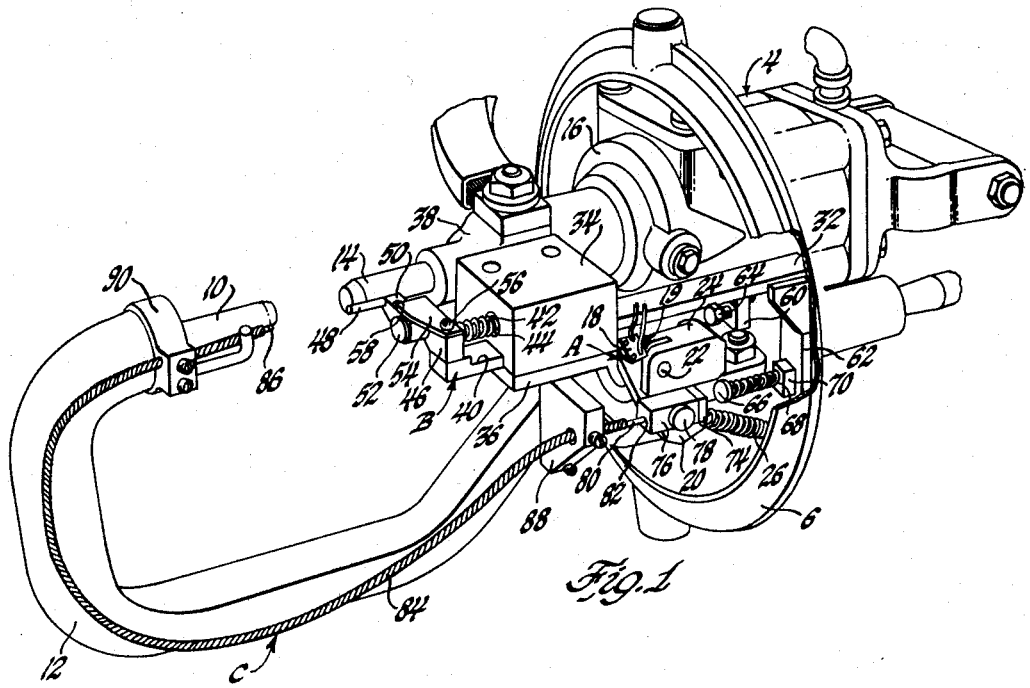

INVENTORS
John J. Goodrich &
BY Thomas W. Shearer, Jr.
E. E. James
ATTORNEY

United States Patent Office 3,135,853
Patented June 2, 1964

3,135,853
AUTOMATIC SCHEDULE SELECTOR FOR
RESISTANCE WELDING APPARATUS
John J. Goodrich, Warren, and Thomas W. Shearer, Jr.,
Auburn Heights, Mich., assignors to General Motors
Corporation, Detroit, Mich., a corporation of Delaware
Filed Dec. 12, 1961, Ser. No. 158,839
12 Claims. (Cl. 219—89)

This invention relates generally to welding apparatus and more particularly to a control device for resistance welding apparatus adapted to automatically establish different welding schedules as to time and current in accordance with variation in the metal thickness placed between welding electrodes.

With resistance welding apparatus for multi-plate seams of different total thickness, the welding time and/or current and sometimes pressure are normally varied to obtain optimum welding results. For this purpose, a thickness probe or operator-actuated switch normally energizes appropriate electrical circuits adapted to provide a predetermined schedule of such variables for properly welding a particular metal thickness. In the past, such schedule selectors have generally required somewhat difficult and often relatively inaccessible manual adjustment for electrode wear and resetting of the thickness probe control elements for different weld thicknesses.

The invention contemplates an improved resistance welding control device which is automatically operable to select a proper schedule of welding variables in accordance with the thickness of metal placed between the welding electrodes, which automatically accommodates and compensates for electrode tip wear and replacement, provides for substantial electrode overtravel without requiring subsequent resetting of the several control elements, and has easily accessible means for quickly resetting the several schedule selecting control elements to accommodate welds of different thicknesses.

The foregoing and other objects, advantages and features of the invention will be apparent from the following description of a preferred illustrative embodiment, having reference to the accompanying drawing in which:

FIGURE 1 is a perspective view of a resistance welding gun incorporating a schedule selecting control device constructed in accordance with the invention with portions of a gun supporting trunnion mount broken away to show the several elements of the control device in their non-welding positions; and FIGURE 2 is an enlarged fragmentary side elevational view showing the relative positions of the several control elements of the schedule selecting device of FIGURE 1 during welding operation of the resistance welding gun.

Referring now more particularly to FIGURE 1, the resistance welding gun is indicated generally by the reference numeral 4. The gun is universally mounted as shown in a trunnion ring 6 which is preferably supported by a suitable overhead hoist mechanism, not shown. The welding gun 4 includes a fixed electrode 10 carried by a U-shaped support arm 12 integral with and extending from frame of the welding gun. A movable electrode 14 is actuated by a reciprocating fluid pressure motor 16 toward engagement with the fixed electrode and normally contacts the multi-plate seam placed between the electrodes for welding.

The welding schedule selector of the invention includes a switch assembly A mounted on the side face of the gun and two cooperating and opposing metal thickness probe assemblies B and C. The primary probe assembly B is slidably mounted laterally of the gun frame for movement with the electrode 14 and is adapted to actuate the secondary probe assembly C to position the switch unit A for schedule selecting actuation whenever the gun is operated with a predetermined minimum seam thickness between the electrodes.

The switch assembly A comprises a snap action switch 18 which is mounted for swinging movement on one arm of a lever 20. A switch actuating plunger 19 is reciprocable between opened and closed positions to selectively energize alternative welding current and timing supply circuits associated with the welding gun. The lever 20 is pivotally supported intermediate its ends by a pin 22 carried by the spaced clevis arms of a bracket member 24 supported laterally of the welding gun. A return spring 26 is tensively interposed between a frame supported bolt 28 and the other arm of the switch mounting lever 20 and normally biases the switch and its mounting lever in a counterclockwise direction, as viewed in the FIGURES 1 and 2.

The probe assembly B includes a bar 32 which is slidably supported adjacent one end thereof by a bearing block 34 and cap 36. The block 34 is secured to and projects laterally of the electrode mounting plunger 38 of the fluid motor. The bar 32 is notched or recessed at 40 to limit its reciprocable movement relative to the bearing block and cap. A spring 42 is compressively interposed between the closed end of a spring receiving guide bore 44 formed in the bearing block and a flange or arm 46 projecting upwardly from the adjacent end of the support bar 32. The spring 42 biases the support bar 32 to the left and thus tends to effect limiting engagement between the bearing block and a stop shoulder 40' formed on the bar by the right end of the recesses 40.

A probe pin 48 carried by a supporting arm member 50 is normally supported in closely spaced parallel relation adjacent the movable electrode 14. The probe supporting arm 50 is pivotally mounted on the shank of a bolt 52 which is threadably secured to the upstanding flange or arm 46 of the bar 42. A trapezoidal spring plate 54 is secured at 56 to the upper end of the upstanding flange 46 and normally engages a detent flat 58 formed on the arm 50 to restrain the arm in its lateral probe supporting position. Deflection of the spring plate 54 permits manual downward swinging of the probe supporting arm 50 to permit removal and replacement of the electrode 14.

The probe pin 48 is of a length to engage the weld seam slightly prior to seam engagement by the movable electrode. The limited further movement of the electrode 14 and of its mounting plunger 38 subsequent to such probe engagement is accommodated by limited movement of the bar 32 relative to its bearing block 34 with resultant compressive deflection of the spring 42. Such spring biased movement of the bar 32 out of limiting engagement with the block 34 permits the schedule selecting device of the invention to accommodate limited electrode overtravel and compensates for both electrode and probe pin wear.

Two spaced parallel arms 60 and 62 depend downwardly of the probe supporting bar 32 adjacent its end distal from the bearing block. A bolt or screw 64 is threadably supported and locked in the shorter intermediate arm 60. This member is threadably adjusted to engage and actuate the plunger of the switch 18 to its circuit closing, schedule selecting position. As explained in greater detail below, such switch actuation is effected only when sufficient cooperative movement of the switch and bar occurs indicative of a seam of the predetermined minimum thickness being located between the electrodes of the actuated gun.

The dependent end of the arm 62 reciprocably mounts a bolt 66. A spring 68 is compressively interposed between the head of the bolt 66 and crosshead flange 70 integral with and projecting from the arm 62. This spring normally biases and extends the bolt to effect limiting engagement between a stop nut 72 adjustably threaded thereon and the depending arm 62. Upon actuation of the fluid motor 16 carrying the electrode 14 into current transmitting engagement with a multi-plate seam placed between the electrodes for welding, the resultant movement of the probe supporting bar 32 carries the spring biased bolt 66 into thrust engagement with a pad 74 carried by the adjacent end of a probe and switch lever actuating block 76.

The block 76 comprises one end of the secondary probe assembly C and is pivotally supported at 78 on the switch mounting lever 20 intermediate the pivot pin 21 and the connection of the tensive return spring 26. The secondary probe assembly C further comprises a flexible Bowden wire probe 80 secured at one end 82 to the block 76. The probe 80 extends through a flexible sheath 84 and projects therefrom at its opposite end 86 adjacent the stationary electrode 10. The sheath 84 is supported adjacent its ends by brackets 88 and 90 which are in turn carried by the electrode supporting arm 12.

Seam-engaging movement of the electrode 14 is transmitted through the bar 32 and the spring-biased bolt 66 to the block 76 and thus causes clockwise rotation of the switch mounting lever 20. Such rotation of the lever 20 carries the switch 18 toward engagement with the shifted switch actuating member 64 and continues until the secondary Bowden wire probe 80 engages the stationary electrode side of the weld seam. As best shown in FIGURE 2, the bolt-limiting stop nut 72 is preferably adjusted so that the flexible probe normally engages the stationary electrode side of the weld seam slightly prior to engagement between the probe pin 48 and the opposite side of the weld seam. After such seam engagement by the flexible probe, further electrode movement imparted to the probe supporting bar 32 is accommodated by compressive deflection of the bolt biasing spring 68 until engagement occurs between the probe pin 48 and its side of the weld seam.

With proper adjustment, the member 64 engages and actuates the switch plunger 19 to its circuit closing, schedule selecting position only when the cooperative probe limited travel and positioning of the lever 20 and of the probe supporting bar 32 correspond to the thinner of two alternative multiple plate seams. When the thicker alternative seam thickness is placed between the electrodes of the welding gun, the switch and its actuating member are limited by the permitted probe travel to their positions shown in FIGURE 2.

From the foregoing, it will be seen that the schedule selecting control device of the invention automatically accommodates and compensates for electrode tip wear and replacement and provides for substantial electrode and probe overtravel without requiring resetting of the several control elements. To accommodate welds of different seam thicknesses, the control device is easily reset by appropriate adjustment of the switch actuating member 64 and of the bolt limiting stop nut 72 to provide the requisite probe travel limits.

While the foregoing description has been limited to one illustrative embodiment, various changes and modifications might be made therein without departing from the spirit and scope of the invention as defined in the following claims.

What is claimed is:

1. A circuit selector for resistance welding apparatus having electrodes movable into contact with seams of alternative thickness, said selector comprising a switch operable between opened and closed positions to selectively energize alternative welding current supply circuits, a primary probe means including a member mounted for limited reciprocable movement with respect to one of the electrodes, a first spring means normally biasing said primary probe means and member for movement with said one electrode and toward engagement with a weld seam placed between the electrodes, an adjustable member carried by and movable with said primary probe member toward actuating engagement with said switch, means supporting said switch for limited movement toward said switch actuating member, a second spring means normally biasing said switch supporting means away from said switch actuating member, a third spring means carried by and associated with said primary probe member and operable upon seam-engaging movement thereof to actuate said switch supporting means toward said switch actuating member, and a secondary probe means engageable with the weld seam opposite said first probe means and operable to limit movement of said switch mounting means by said primary probe member and third spring means in accordance with the thickness of the electrode engaged weld seam whereby switch actuating engagement occurs only when the effected cooperative movement of said switch and of the adjusted actuating member corresponds to a predetermined minimum seam thickness.

2. A circuit control mechanism for a resistance welder having electrodes movable into current transmitting contact with multi-plate metal seams of different thickness, said control mechanism comprising a switch operable between opened and closed positions to selectively energize alternative welding current supply circuits, a first probe means movable with one of said electrodes and engageable with a weld seam placed between the electrodes, an adjustable switch actuating member carried by said first probe means and movable therewith toward actuating engagement with said switch, means supporting said switch for movement toward said actuating member and engageable by said first probe means to shift said switch toward actuating engagement with its actuating member, and a second probe means engageable with the side of the weld seam opposite said first probe means and operable to limit movement of said switch mounting means by said first probe means in accordance with the thickness of the weld seam placed between the electrodes and probe means, said switch actuating member being so adjusted that engagement normally occurs between said switch and the actuating member only when the probe limited cooperative movement thereof is indicative of a minimum alternative seam thickness placed between electrodes.

3. Circuit control mechanism for resistance welding apparatus having electrodes movable into current transmitting contact with multi-plate metal seams of alternative thickness, said control mechanism comprising a switch operable to energize alternative current supply circuits, a first probe means movable with one of said electrodes into engagement with a weld seam placed between the electrodes, a switch actuating member carried by said first probe means, means mounting said switch for limited movement toward said switch actuating member, means carried by said first probe means and engageable with said mounting means to actuate said switch toward actuating engagement with said actuating member, and a second probe means engageable with the side of the weld seam opposite said first probe means and operable to limit movement of said switch mounting means by said first probe carried means in accordance with the thickness of the weld seam placed between the electrodes whereby switch actuating engagement occurs only when the probe means limited cooperative movement of said member and switch corresponds to a minimum alternative seam thickness.

4. Circuit control mechanism for a resistance welder having electrodes movable into welding contact with seams of alternative thickness, said mechanism including
a switch operable to energize alternative current supply circuits,
a switch actuating member movable with one of said electrodes toward engagement with a weld seam placed between the electrodes,
means mounting said switch for limited movement toward said actuating member,
means carried by said actuating member and engageable with said mounting means to actuate said switch toward said actuating member,
and means engageable with the weld seam opposite said actuating member to limit movement of said switch mounting means by said switch actuating member in accordance with the thickness of the weld seam placed between the electrodes whereby switch actuating engagement occurs only when the cooperative movement of said member and switch corresponds to a minimum alternative seam thickness.

5. A circuit selector for resistance welding apparatus having electrodes movable into welding contact with multi-plate metal seams of alternative thickness, said selector comprising
a switch operable between opened and closed conditions to selectively energize alternative current supply circuits,
a switch actuating member movable with one of said electrodes toward engagement with a weld seam placed between the electrodes,
means mounting said switch for limited movement relative to said actuating member,
and means operable to adjust said switch mounting means in accordance with the thickness of the weld seam placed between the electrodes whereby switch actuating engagement occurs only when the cooperative movement of said member and switch corresponds to a minimum alternative seam thickness.

6. A circuit control mechanism for a resistance welder having electrodes movable into current transmitting contact with multi-plate metal seams of different thicknesses placed therebetween, said control mechanism comprising
a switch operable between opened and closed positions to selectively energize alternative welding surrent supply circuits,
a first primary probe means including a probe supporting member reciprocably mounted for limited movement with respect to one of the electrodes,
a first spring means compressively interposed between said probe supporting member and said one electrode and normally biasing said member toward engagement with a weld seam placed between the electrodes,
said probe supporting member having a depending portion movable therewith toward actuating engagement with said switch,
a switch engageable actuating member adjustably carried by said depending portion,
a lever member pivotally mounted intermediate its ends and carrying said switch on one end for swinging movement toward said switch actuating member,
a second spring means normally biasing the switch supporting end of said lever member away from said depending portion,
a third spring means including a member reciprocably supported by said switch actuating member and normally operable to actuate said switch supporting lever member toward actuating engagement between said switch and actuating member,
and a secondary probe means engageable with the side of the weld seam opposite said first probe supporting member and operably connected to limit switch actuating swinging movement of said lever member against the biasing action of said third spring means whereby actuating engagement occurs between said switch and actuating member only when the probe limited movement thereof coresponds to a predetermined minimum seam thickness between electrodes.

7. A circuit control selector for resistance welding apparatus having electrodes movable into current transmitting contact with seams of different thicknesses placed therebetween, said control mechanism comprising
a switch operable between opened and closed positions to selectively energize alternative welding current supply circuits,
a primary probe means including a member mounted for limited reciprocable movement with one of the electrodes,
a first spring means normally biasing said member toward engagement of said primary probe means with a weld seam placed between the electrodes,
a switch actuating member adjustably carried by said primary probe member,
means supporting said switch for limited movement toward said switch actuating member,
a second spring means normally biasing said switch supporting means away from said switch actuating member,
means carried by an associated with said primary probe member and normally operable to actuate said switch supporting means toward actuating engagement between said switch and said switch actuating member,
and a secondary probe means engageable with the side of the weld seam opposite said primary probe means to limit movement of said switch supporting means toward said switch actuating member, switch actuating engagement occurring between said switch and the adjusted actuating member only when their probe limited cooperative movement corresponds to a predetermined minimum seam thickness between electrodes.

8. Circuit control mechanism for a resistance welder having electrodes movable into welding contact with multi-plate seams of alternative thickness, said control mechanism comprising
a switch operable between opened and closed positions to selectively energize alternative welding current supply circuits,
a switch actuating member mounted for limited movement with one of the electrodes,
a first spring means normally biasing said actuating member for movement with said one electrode toward engagement with a weld seam placed between the electrodes,
means supporting said switch for limited movement toward said actuating member,
a second spring means normally biasing said switch supporting means away from said actuating member,
a third spring means carried by said actuating member and operable to actuate said switch supporting means toward said switch actuating member,
and probe means engageable with the weld seam opposite said one electrode and operably connected to limit movement of said switch mounting means toward said switch actuating member, whereby switch actuating engagement occurs between said switch and the actuating member only when the probe limited cooperative movement thereof corresponds to a predetermined minimum seam thickness.

9. A circuit selector for resistance welding apparatus having electrodes movable into welding current transmitting contact with seams of different thickness, said selector comprising
a switch operable between opened and closed positions to selectively energize alternative welding current supply circuits, an adjustable switch actuating member mounted for limited reciprocable movement with one of the electrodes and having a depending portion engageable with said switch, a first spring means compressively interposed between said actuating member and said one electrode and normally biasing said member toward a weld seam placed between the electrodes, a lever member pivotally supported intermediate its ends and mounting said switch on one end thereof for swinging movement towards said switch actuating depending portion, second spring means normally biasing the switch mounting end of said lever member away from said depending portion, a third spring means including a member reciprocably and resiliently supported by said switch actuating member and normally operable to actuate said lever member toward actuating engagement between said switch and said depending portion, and a secondary probe means engageable with the side of the weld seam opposite said switch actuating member and operably connected to limit switch actuating swinging movement of said lever member against the biasing action of said third spring means whereby actuating engagement occurs between said switch and adjusted actuating member only when the probe limited cooperative movement thereof corresponds to a predetermined movement indicative of a minimum alternative seam thickness between electrodes.

10. In a circuit control mechanism for a resistance welder having electrodes movable into welding contact with seams of alternative thickness, a switch operable between opened and closed positions to selectively control the energization of alternative current supply circuits, a switch actuating member movable with one of said electrodes toward engagement with a weld seam placed between the electrodes, means mounting said switch for limited movement relative to said actuating member, and means engageable by said actuating member and operable to adjust said switch mounting means in accordance with the thickness of the weld seam placed between the electrodes whereby switch actuating engagement occurs only when the cooperative movement of said member and switch corresponds to a minimum alternative seam thickness.

11. Circuit control mechanism comprising a switch operable between opened and closed positions to selectively energize alternative control circuits, probe means including a switch actuating member reciprocable in accordance with the thickness of work pieces passing relative thereto, means mounting said switch for limited movement relative to said actuating member, and means engageable by said actuating member and operable to adjust said switch mounting means in accordance with the thickness of the work piece passing said probe means whereby switch actuating engagement occurs only when the cooperative movement of said member and switch is indicative of a passing work piece of less than a predetermined thickness.

12. Circuit control mechanism comprising a switch operable between opened and closed positions to selectively energize alternative electrical control circuits, a primary probe means including a switch actuating member reciprocable in accordance with the thickness of work pieces passing relative thereto, means supporting said switch for limited movement relative to said switch actuating member, a first spring means normally biasing said switch supporting means away from said switch actuating member, a second spring means carried by said primary probe means and operable upon work engaging movement thereof to actuate said switch supporting means toward said switch actuating member, and a secondary probe means engageable with the side of the work piece opposite said first probe means and operably connected to limit movement of said switch mounting means by said second spring means in accordance with the thickness of the work piece passing said first probe means whereby switch actuating engagement occurs between said switch and the actuating member only when the probe limited cooperative movement therebetween is indicative of a passing work piece of less than a predetermined minimum thickness placed between probe means.

References Cited in the file of this patent
UNITED STATES PATENTS

| | | |
|---|---|---|
| 1,848,905 | Rabezzana | Mar. 8, 1932 |
| 3,049,607 | Stuben et al. | Aug. 14, 1962 |